Nov. 28, 1967  K. SCHMID  3,354,629
SPINDLE FOR SPINNING AND TWISTING MACHINE
Filed Feb. 14, 1966  2 Sheets-Sheet 1

KARL Schmid
INVENTOR.
BY Werner W. Kleeman
His Attorney

United States Patent Office 3,354,629
Patented Nov. 28, 1967

3,354,629
SPINDLE FOR SPINNING AND TWISTING MACHINE
Karl Schmid, Zurich, Switzerland, assignor to Oerlikon-Buhrle Holding A.G., Zurich, Switzerland, a corporation of Switzerland
Filed Feb. 14, 1966, Ser. No. 527,167
Claims priority, application Switzerland, Feb. 19, 1965, 2,291/65
7 Claims. (Cl. 57—135)

ABSTRACT OF THE DISCLOSURE

A spindle construction for a spinning and twisting machine comprising a spindle housing, a collar bearing, and a detachable housing portion carrying said collar bearing for fixedly mounting such collar bearing with said spindle housing. Further, a bearing sleeve is disposed within the spindle housing, and means are provided for resiliently mounting the bearing sleeve within said spindle housing. The resilient mounting means comprises at least one annular disk for suspending the bearing sleeve within the spindle housing, and said spindle housing possesses shoulder means against which bears said annular disk. This annular disk is fixedly retained by the detachable housing portion between the latter and the aforementioned shoulder means.

---

Figure 1:
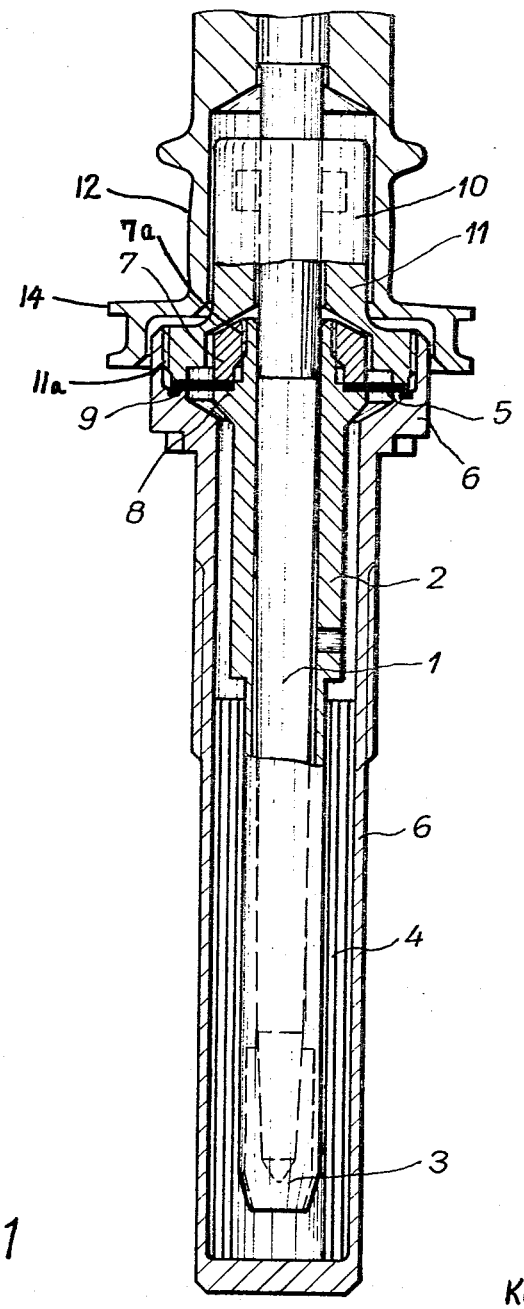

The present invention has reference to an improved spindle construction for spinning and twisting machine and is of the type incorporating a bearing sleeve flexibly mounted within the spindle housing.

In principle there are a number of solutions for the elastic mounting of these bearing sleeves. According to one such solution, the collar bearing is rigidly connected with the spindle housing. A second solution has the collar bearing rigidly connected with the bearing sleeve and therefore partakes in the oscillations of the spindle and thus only with difficulty can absorb transverse forces.

One such spindle of this type which is known is mounted, on the one hand, in a footstep bearing and, on the other hand, in a collar bearing. The footstep bearing is arranged in known manner in the bearing sleeve. The latter is swingingly connected with the spindle housing by means of a resilient membrane disposed in a plane extending transverse to the spindle axis, and the collar bearing is arranged in the bearing sleeve and above the clamping location of the aforesaid membrane or diaphragm. Such physical structure, however, possesses considerable disadvantages because the forces acting upon the spindle are transmitted via the collar bearing and the footstep bearing to the bearing sleeve and solely by the latter via the membrane to the spindle housing. Apart from the fact that by virtue of the foregoing action the membrane is subjected to a great load and therefore considerable wear, the return force of the membrane is not sufficient, after deflection of the spindle transverse to the spindle axis, to again return such spindle into an exact axial alignment, in other words, to bring it back into its centered position.

Now, the present invention concerns itself with a spindle arrangement or construction of the type wherein the collar bearing is fixedly connected with the spindle housing.

With such arrangements it is already known to construct the bearing sleeve containing the footstep bearing in the form of a tube and to provide a wave-shaped configuration for its upper portion situated beneath the collar bearing. Such physical structure of the bearing sleeve strives to provide the elastic force necessary for returning the positional displacement of the spindle brought about by the oscillations and thus to promote dampening of the oscillations. The stressing of this wave-shaped portion of the bearing sleeve is very large since the waved portions are continuously alternatingly flattened and bent upwards.

Furthermore, it is known to provide the portion of the bearing sleeve located beneath the collar bearing with a screwline or helically extending slot passing through the body of the bearing sleeve for the purpose of generating the required elastic return force. However, this construction weakens the cross-section of the sleeve and therefore there is present the danger of rupture.

Moreover, a spindle construction is known wherein the collar bearing is arranged in an upper housing portion. This upper housing portion in turn is inserted in the spindle housing and retained by the clamping action of a spring. A bearing sleeve containing the footstep bearing is resiliently suspended in the upper housing portion. For this purpose the upper end of the bearing sleeve is provided with an annular or ring flange which is clamped between two rubber rings located in the upper housing portion. A disadvantage of this construction is that the collar bearing, owing to the resilient arrangement of the upper housing portion, can very easily evade a lateral load and thus the spindle loses its exactly centered position. This unstable support is additionally reinforced by the bearing sleeve arranged between the rubber rings. The return force of the rubber rings is not sufficient to exactly guide the bearing sleeve and to return such from a deflected condition back again into the centered position. These disadvantages result in the spinning geometry becoming slightly impaired and there is no longer ensured for uniform winding of the yarn onto the cop or bobbin. The yarn is therefore, during a rotation of the traveller, continually subjected to fluctuating tensions which can either immediately result in yarn rupture or at least a weakening of the yarn, so that the latter can tear when it is further processed.

The known constructions have the further disadvantage that the elasticity of the bearing sleeves must be adjusted to a predetermined load and is rigidly fixed and upon changing the load, for instance by larger cops, it is necessary to install a different bearing sleeve.

Now, a primary object of the present invention is to provide an improved spindle construction which effectively overcomes the aforementioned disadvantages of the prior art structures.

Another, more specific object of the invention is to overcome the aforementioned disadvantages and to provide a spindle structure which is relatively simple in construction and highly reliable in operation, possessing an exact guiding and return of the spindle, can be easily accommodated to different operating conditions and the components which are subjected to wear can be easily exchanged or replaced.

The inventive spindle construction for spinning and twisting machines having a collar bearing fixedly arranged by means of a housing portion at the spindle housing and a bearing sleeve which is resiliently mounted, is characterized by the features that, the bearing sleeve is suspended by means of at least one known annular disk or ring-shaped disk. Moreover, this annular disk bears against a shoulder of the spindle housing and is fixedly held by the detachable housing portion carrying the collar bearing between such housing portion and the aforesaid shoulder.

The inventive spindle construction possesses considerable advantages. Owing to the rigid arrangement of the collar bearing in the upper housing portion, which is also fixedly arranged in the spindle housing, there is provided the one support for carrying and guiding the spindle. The collar bearing absorbs the major portion of the forces occurring during a deviation or deflection of the spindle and transmits such directly to the spindle housing. Additionally, by virtue of the collar bearing itself, there is produced a return force which is predicated upon a certain deformation of the bearing during deviation of the spindle.

A further considerable advantage of the inventive spindle construction resides in the exceptionally simple and effective suspension of the bearing sleeve by means of a known annular disk. As a result, complicated constructed and therefore expensive bearing sleeves are no longer required. Due to the exchangeability of the annular disks at the spindle housing as well as at the bearing sleeve, it is possible to replace the annular disk, and according to requirements, to adjust a stronger or weaker return force without having to replace the entire bearing sleeve.

A major simplification of the construction of the inventive spindle is obtained in that the upper housing portion is itself utilized for clamping the annular disk, and therefore additional elements are superfluous.

Figure 2:
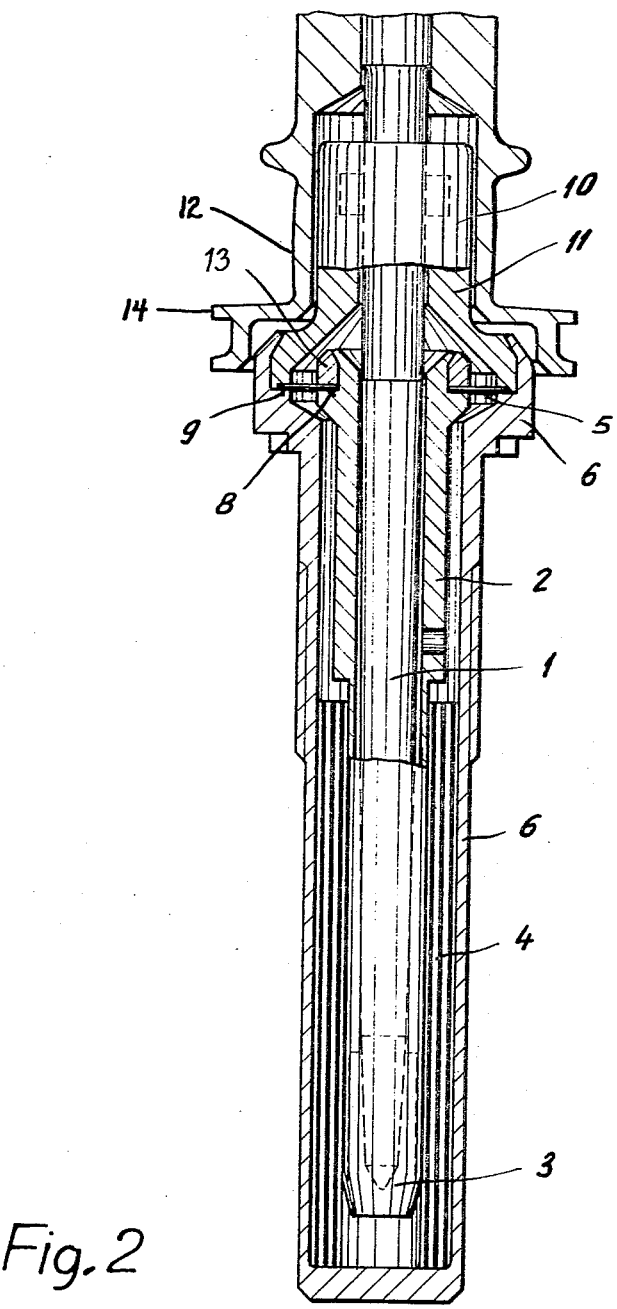

Other features, objects and advantages of the invention will become apparent by reference to the following detailed description and drawings wherein like reference characters have been used for substantially the same or analogous elements throughout the various embodiments, and in which:

FIGURE 1 is a longitudinal cross-sectional view of a first embodiment of inventive spindle construction having an annular disk clamped by threaded elements; and FIGURE 2 is a longitudinal cross-sectional view of a modified embodiment of spindle construction wherein the annular disk is clamped by elements which are secured by flanging.

Describing now the drawings and initially considering the embodiment of spindle construction of FIGURE 1, it will be recognized that the spindle center shaft 1 is mounted in a bearing sleeve 2 by means of the footstep bearing 3. This bearing sleeve 2 is encircled at its lower region by dampening spirals or coils 4, in known manner. The bearing sleeve 2 is supported within the spindle housing 6 at the region of its upper end by means of an elastic suspension element or arrangement which consists of one or more superimposed and known elastic annular disks 5, for instance formed of metal, and directly secured to the spindle housing 6. As clearly shown in FIGURE 1, such attachment can take place in the manner that, on the one hand, the annular disk 5 is pressed at the region of its inner circumference by means of a threadable clamping ring 7 against a shoulder 8 of the bearing sleeve 2 and, on the other hand, at the region of its outer circumference bears against a shoulder 9 of the spindle housing 6 and is pressed against such shoulder 9 by a housing portion 11 detachably threadable with the spindle housing 6 and carrying the collar bearing 10. As a result, the bearing sleeve 2 is swingingly suspended by its upper end at the spindle housing 6. The threading for securing the clamping or retaining ring 7 with the upper end of the bearing sleeve 2 is indicated by reference character 7a, and that for threadably attaching the upper housing portion 11 with the spindle housing 6, by reference character 11a.

If oscillations and thus forces appear at the spindle central shaft 1, then such are taken up by the collar bearing 10. The lower end of the spindle central shaft 1 oscillates about the collar bearing 10 and transmits its oscillations via the footstep bearing 3 to the bearing sleeve 2. The oscillations of the bearing sleeve 2 are partially taken up by the dampening means, i.e. coils 4. Return of the spindle back into the rest position, i.e. the centered position, takes place on the one hand and primarily by virtue of the torsion and bending forces appearing at the annular disk 5 in consequence of the deviation of the bearing sleeve 2 and, on the other hand, also due to the deformation forces of the collar bearing 10. It has been found that the return forces are very large in the case of a deformed annular disk which is clamped at its outer and inner edges.

In the present exemplary embodiment, the annular disk 5 is freed or accessible after removing the support element 12 for the spool possessing the whirl 14, the housing portion 11 with the collar bearing 10, and the retaining ring 7, so that replacement of such annular disk 5 by a weaker or stronger one, or by a number of such disks, is readily possible. This embodiment renders it possible to accommodate the return force to the special conditions, or situations which occur during operation, for example spool weight, rotational speed and so forth, without having to resort to the use of a special bearing sleeve for each individual situation.

In contradistinction to the depicted embodiment of FIGURE 1, it is also possible to carry out the fixed clamping of the annular disk or disks 5 in the manner depicted by the embodiment of FIGURE 2, wherein the upper end of the bearing sleeve 2 is flanged or flexed outwardly and presses the clamping or retaining ring 13 against the aforesaid annular disk 5, whereby clamping of the latter at its inner circumference is effected. Clamping of this annular disk 5 at its outer circumference occurs by virtue of the fact that the upper edge of the spindle housing 6 is inwardly flanged or flexed in such a manner that it presses against an annular surface of the housing portion 11, as shown. Also in this case it is possible to carry out a replacement or exchange of the annular disk or disks by opening the flanges or flexed portions previously described. Of course, this manner of exchange is more suitable for the replacement of worn annular disks.

With this illustrated manner of attachment the elasticity of the annular disk or disks 5 must correspond to a certain load which is dependent upon the rotational speed of the spindle and the weight of the cop. With a different load a different mounting arrangement must be used. However, this different mounting arrangement only differs from that illustrated insofar as it possesses other annular disks, with larger loads a greater number or disks of different material, whereas all remaining components, such as housing, sleeve, bearings and so forth, are the same. This simplifies and renders less expensive the bearing support for different loads or requirements.

A further advantage of the present embodiment with respect to known constructions also resides in the fact that the bearing sleeve itself is not subjected to any loads for generating the return forces, so that the properties of the material of the sleeve are of no moment. In the present invention, wherein the sleeve itself is rigid and elastically suspended, the return force is only generated at the annular disk; the sleeve is not influenced with regard to its form by the oscillations.

By virtue of the inventive spindle constructions there is additionally ensured that the spindle, after a deviation or deflection out of its centered position, returns considerably quicker and more exactly back into such centered position. Comparative tests between known spindles and the inventive spindle structures have clearly shown or proven their advantages. With a known spindle, after a deflection of the stationary spindle tip of ten millimeters, there remained an eccentricity of from three to five millimeters. This remaining eccentricity did not first occur with a renewed deflection, rather already with the first deflection and could neither be annulled during stand-still nor during rotation.

On the other hand, with the inventive spindle constructions and with the same deflection of the spindle point or tip, it was possible to determine not only by the first deflection but also by repeated deflection a remaining eccentricity of maximum 0.2 to 0.3 millimeters. The thus resulting apparent advantages with respect to the quality of the cop should therefore be obvious.

While there is shown and described present preferred embodiments of the invention, it is to be distinctly understood that the invention is not limited thereto but may be otherwise variously embodied and practised within the scope of the following claims.

What is claimed is:

1. In a spindle construction for a spinning and twisting machine comprising a spindle housing, a collar bearing, a detachable housing portion carrying said collar bearing for fixedly mounting said collar bearing with said spindle housing, a bearing sleeve disposed within said spindle housing, and means for resiliently mounting said bearing sleeve within said spindle housing, said resilient mounting means comprising at least one annular disk for suspending said bearing sleeve within said spindle housing, said spindle housing having shoulder means against which bears said annular disk, said annular disk being fixedly retained by said detachable housing portion between the latter and said shoulder means.

2. In a spindle construction as defined in claim 1, wherein said annular disk is detachably arranged between said spindle housing and said detachable housing portion, so that it can be easily removed and replaced.

3. In a spindle construction as defined in claim 1, further including means for threadably connecting said detachable housing portion with said spindle housing.

4. In a spindle construction as defined in claim 1, wherein the upper end of said spindle housing is flanged to engage and fixedly clamp said detachable housing portion.

5. In a spindle construction as defined in claim 1, further including a retaining ring threadably connected with said bearing sleeve for fixedly clamping said annular disk against said bearing sleeve.

6. In a spindle construction as defined in claim 1, wherein the upper end of said bearing sleeve is flanged to fixedly clamp said annular disk against said bearing sleeve.

7. In a spindle construction as defined in claim 6, further including a retaining ring disposed between said flanged upper end of said bearing sleeve and said annular ring to fixedly retain the latter.

References Cited

UNITED STATES PATENTS 3,065,593 11/1962 Westall et al. _____ 57—135

FOREIGN PATENTS 1,126,532 6/1956 France.
621,288 4/1949 Great Britain.

WILLIAM S. BURDEN, *Primary Examiner.*